(12) United States Patent
Daniels

(10) Patent No.: US 9,206,911 B1
(45) Date of Patent: Dec. 8, 2015

(54) SHUTTER VALVE WITH SEALS

(71) Applicant: Kyle P Daniels, Coral Gables, FL (US)

(72) Inventor: Kyle P Daniels, Coral Gables, FL (US)

(73) Assignee: CLARKE INDUSTRIAL ENGINEERING, North Kingstown, RI (US)

( * ) Notice: Subject to any disclaimer, the term of this patent is extended or adjusted under 35 U.S.C. 154(b) by 0 days.

(21) Appl. No.: 14/795,442

(22) Filed: Jul. 9, 2015

Related U.S. Application Data

(60) Provisional application No. 62/041,935, filed on Aug. 26, 2014.

(51) Int. Cl.
  *F16K 3/03* (2006.01)
  *F16K 3/02* (2006.01)

(52) U.S. Cl.
  CPC .............. *F16K 3/03* (2013.01); *F16K 3/0227* (2013.01)

(58) Field of Classification Search
  CPC .................................. F16K 3/03; F16K 3/0227
  USPC .................................. 251/212, 118; 137/242
  See application file for complete search history.

(56) References Cited

U.S. PATENT DOCUMENTS

| | | | |
|---|---|---|---|
| 1,343,477 A | 6/1920 | March | |
| 1,595,300 A | 8/1926 | Halloran | |
| 1,999,699 A | 4/1935 | Koch | |
| 2,043,337 A | 6/1936 | Smith | |
| 2,307,273 A * | 1/1943 | Hughes | G05D 7/0173 251/212 |
| 2,830,617 A * | 4/1958 | Brown | F16K 3/03 251/212 |
| 3,101,736 A * | 8/1963 | Egger | F16K 3/03 137/242 |
| 3,329,396 A * | 7/1967 | Heaton | C03B 7/088 251/212 |
| 3,787,022 A * | 1/1974 | Wilcox | F16K 3/03 251/212 |
| 4,094,492 A * | 6/1978 | Beeman | F16K 3/03 251/212 |
| 4,232,595 A | 11/1980 | Cox | |
| 4,893,225 A * | 1/1990 | Solomon | F21V 11/10 353/84 |
| 5,806,725 A * | 9/1998 | Bennett | A21C 9/04 251/212 |
| 6,375,155 B1 * | 4/2002 | Janssens | F16L 55/10 251/212 |
| 7,819,728 B2 * | 10/2010 | Beckley | B60H 1/3407 251/212 |
| 8,132,783 B2 | 3/2012 | Luebbers | |
| 8,316,820 B1 * | 11/2012 | Cammarata | F16K 3/03 251/304 |
| 8,430,140 B2 * | 4/2013 | Ognjanovski | B60K 15/0406 251/212 |
| 2009/0025416 A1 | 1/2009 | Murakami | |
| 2014/0124061 A1 | 5/2014 | Daniels | |

FOREIGN PATENT DOCUMENTS

| | | |
|---|---|---|
| FR | 1147940 | 12/1957 |
| GB | 579471 | 8/1946 |

* cited by examiner

*Primary Examiner* — John Bastianelli

(57) ABSTRACT

A shutter comprising an actuator ring that rotates about a midpoint and three obturator elements movably coupled to the actuator ring. A housing defines a cavity for holding the actuator ring and the obturator elements. The system also includes a plurality of wipers. Each wiper comprises a seal material and acts as a seal disposed between a first or second surface of the obturator elements and a first or second planar surface of the housing. The system also includes curved grooves adapted for receiving a wall seal when valve moves between an open and closed position. When the valve moves between an open and closed position, one end of the obturator element contacts the wall seal and the plurality of wall seals prevent egress of fluid into at least a portion of the cavity of the housing.

17 Claims, 8 Drawing Sheets

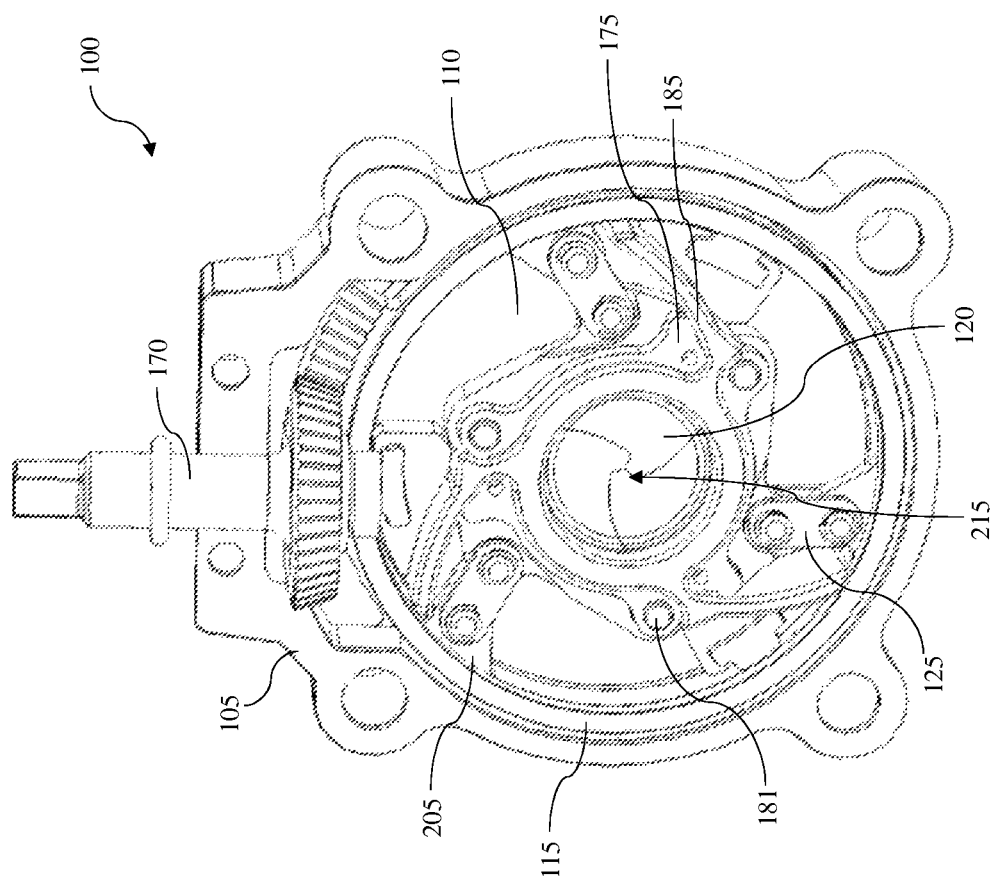

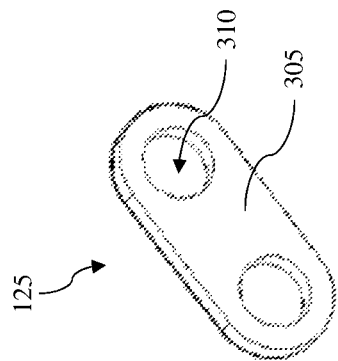
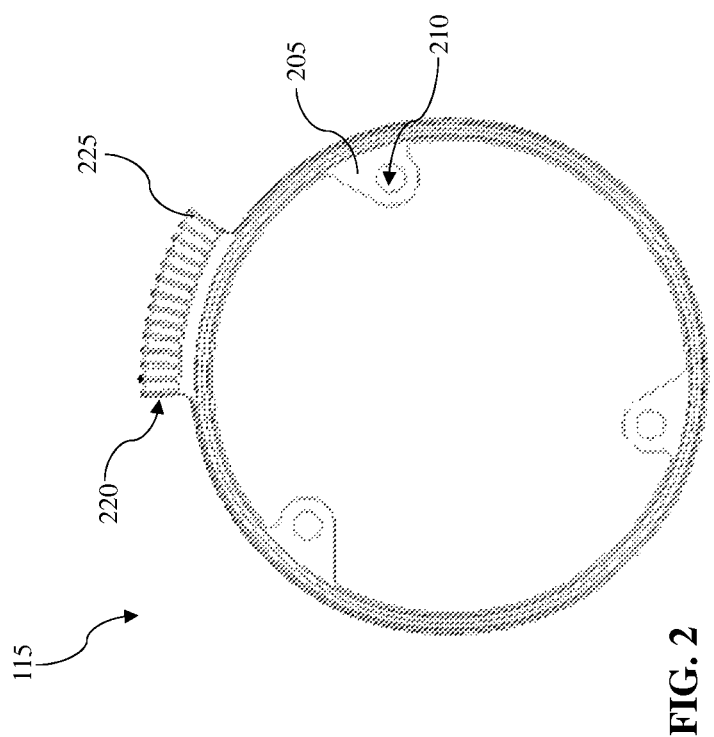

SHUTTER VALVE WITH SEALS

CROSS-REFERENCE TO RELATED APPLICATIONS

This patent application claims priority to provisional application No. 62/041,935 filed Aug. 26, 2014. The subject matter of provisional application No. 62/041,935 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The invention disclosed broadly relates to the field of valve systems, and more particularly relates to the field of shutter valves for pressure regulation and the control of fluids in machines.

BACKGROUND

One of the problems with conventional valves is the lack of the ability to regulate the amount of fluid flow through the valve. This is because most conventional valves typically only offer an on and off position. Completely stopping fluid flow, i.e., turning the valve to the off position, results in a steep pressure drop, which can cause a shockwave in the system and can result in cavitation. This can reduce the lifespan of the valve, as well as the system as a whole. Another problem with conventional valves is the lack of the ability to remain securely sealed in a pressurized system. This insecurity in said processes can cause leakage. Yet another common problem with conventional valves is that the obturator element remains within the lumen of the flow of gas or liquid, as with a butterfly valve, thereby interrupting fluid flow. This approach creates a disruption in the fluid flow and can cause potential currents that can produce cavitation. This negative result can also directly reduce the life span of a valve, pipe, or the entire system altogether. Yet another common problem with the conventional valves is that they include cavities and pockets that may be flooded with the fluids or gases that pass through the lumen. This can pose a problem when dealing with fluids that are considered foodstuffs, because foodstuff that is caught in small pockets can rot or otherwise decay, thereby causing contamination. Furthermore, valves used in foodstuff applications must be cleaned regularly. Therefore, the presence of cavities or pockets that collect foodstuffs can make it difficult to clean the valve.

One possible approach to the above-described problems is the use of an iris valve, which utilizes obturator elements within the lumen of the flow area, wherein the obturator elements open and close in an annular array to regulate the flow of gases or liquids. This removes all obstructions to the flow of gases and liquids when the valve is in the open position. But conventional iris valves also possess the same problem with remaining securely sealed, especially in a pressurized system. Thus, many conventional iris valves suffer from leakage caused by the inability to seal properly. The inability of conventional iris valves to seal properly has limited the uses and useful life span of the iris valve. In many cases, various industries have not used iris valves because of this problem.

Consequently, a need exists to overcome the problems with the prior art as discussed above, and particularly for a more efficient valve that seals properly.

SUMMARY

A shutter valve for regulating pressure and controlling fluid flow is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a shutter valve for regulating pressure and controlling fluid flow is disclosed. The shutter valve comprises an actuator ring that rotates about a midpoint. Three or more obturator elements are movably coupled to the actuator ring. Each obturator element includes a first surface opposing a second surface. A housing defines a cavity for holding the actuator ring and the obturator elements and includes a first planar surface that faces the first surface of each obturator element and further includes a second planar surface that faces the second surface of each obturator element. The system also includes a plurality of wipers. Each wiper comprises a seal material disposed on the first or second surface of the obturator elements such that each wiper contacts the first or second planar surface of the housing. Each wiper acts as a seal disposed between the first or second surface of the obturator elements and the first or second planar surface of the housing. The system also includes curved grooves are disposed on the first and second planar surfaces of the housing. Each curved groove is adapted for receiving a wall seal and extends along an arc followed by one end of each obturator element when it moves between an open and closed position. The system also includes a plurality of wall seals, wherein each wall seal is disposed within each curved groove. When a corresponding obturator element moves between an open and closed position, one end of the obturator element contacts the wall seal, which acts as a seal disposed between the wall seal and the obturator element. The seals created by the plurality of wipers and the plurality of wall seals prevent egress of fluid into at least a portion of the cavity of the housing.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 1A is a perspective view of the shutter valve in a closed position having a part of the housing removed, according to an example embodiment;

FIG. 2 is a front view of an actuator ring of the shutter valve, according to an example embodiment;

FIG. 3 is a perspective front view of a pivot arm of the shutter valve, according to an example embodiment;

DETAILED DESCRIPTION

Figure 1B:
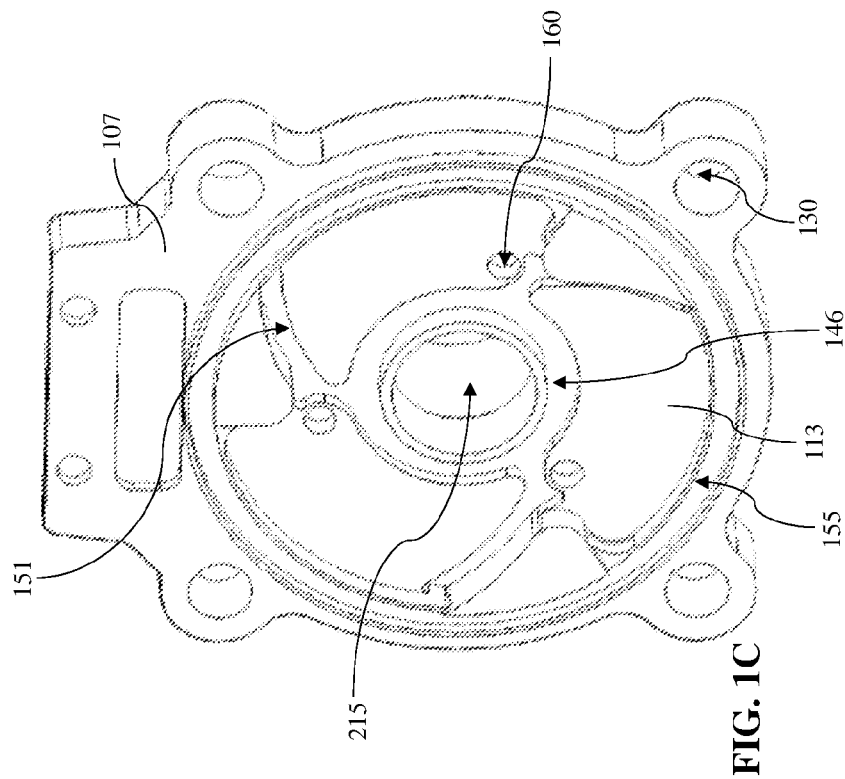
FIG. 1B is a perspective view of a first part of the housing of the shutter valve, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting, reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments solve problems with the prior art by providing a simplified shutter valve that allows for pressure regulation and for controlling the amount of fluid flow through the valve by regulating the aperture through which said fluid may flow. The disclosed embodiments further improve over the prior art by providing a system that allows for adjusting the lumen through which fluid flows. This allows a user to choose a desired size of the lumen, so as to regulate pressure and fluid flow through the valve. The disclosed embodiments further improve over the prior art by providing a system that allows for closure of the valve by progressively making the lumen through which fluid flows smaller until there is no aperture for allowing fluid flow, thereby eliminating a steep pressure drop, shockwaves in the system and cavitation. The disclosed embodiments also improve over the prior art by providing the ability to remain securely sealed throughout various types of processes. The disclosed embodiments further improve over the prior art by allowing the fluid to pass through the valve unobstructed when in the open position. The disclosed embodiments further improve over the prior art by reducing or eliminating cavities and crevices in the valve that may be flooded with the fluids or gases that pass through the lumen. This eliminates the possibility of foodstuff, debris, or other substances being caught in small pockets that can then rot or otherwise prevent sterilization. Furthermore, this simplifies the process of cleaning said valves, when used in foodstuff applications, which require regular cleaning.

Referring now to the figures, FIG. 1A illustrates a perspective front view of the shutter valve 100 having a part (illustrated as 107 in FIG. 1C) of the housing removed, according to an example embodiment. The housing has a first part 105 that couples with a second part (illustrated as 105 in FIG. 1B) and defines a cavity that houses an actuator ring 115, three or more obturator elements 120 and a plurality of pivot arms 125.

Figure 1C:
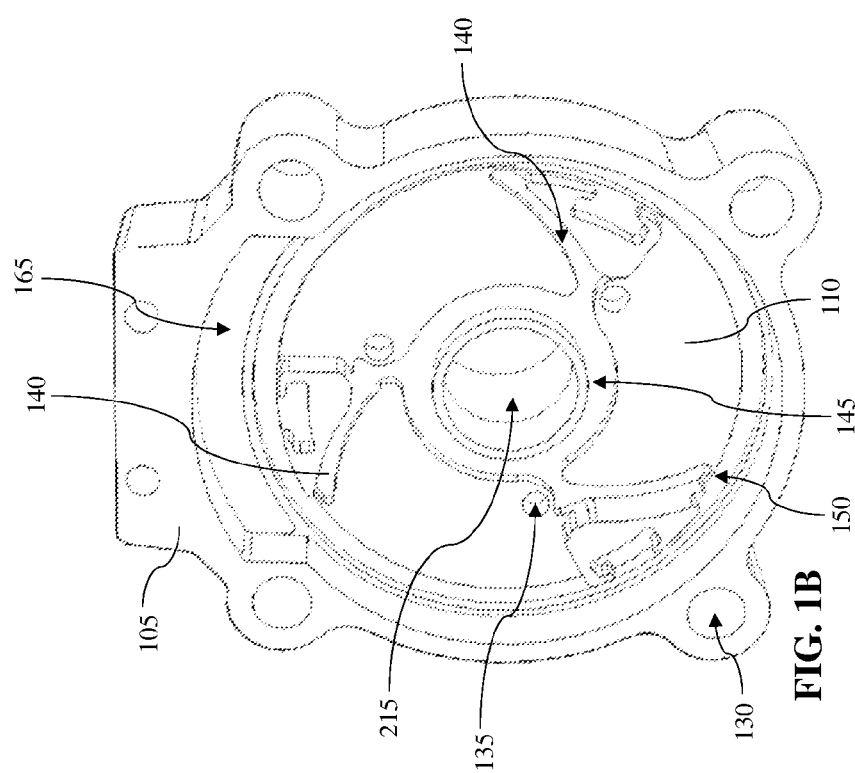
FIG. 1C is a perspective view of a second part of the housing of the shutter valve, according to an example embodiment.

Referring to FIGS. 1A-1C, the first part 105 and second part 107 of the housing are shaped to couple with each other so as to define the cavity for housing the obturator elements, actuator ring and other components of the shutter valve. Both the first and second parts of the housing have bosses 130 near the circumference of the housings. Fasteners may be inserted into the bosses in order to couple the first and second parts of the housing to each other each other. In the present embodiment, such fasteners may include a bold and a nut.

The housing further defines a central aperture 215 defined by a circular shape opening in the center of both the first and second parts of the housing. A tubular shaped body (not shown) can be coupled to each side of outward facing surfaces of the first and second housing.

The first part of the housing comprises a first planar surface 110 that faces the first surface of each of the obturator elements and the second housing includes a second planar surface that faces the second planar surface 113 of each of the obturator elements. Each of the obturator elements is pivotally attached to a pivot arm 125. Each pivot arm is pivotally attached to a pin boss 205 of the actuator ring. The three obturator elements are arranged in a circular array along and inside circumference of the actuator ring. It should be noted that more than three obturator elements can be used. The three obturator elements can move between an open position and a closed position.

In FIG. 1A, the obturator elements are disposed in the closed position. In the closed position, substantial portions of the three obturator elements partially block the central aperture such that fluids, solids, or mixtures are unable to pass through the central aperture 215 of the housing of the valve. When forces tangential to the actuator ring are applied to the gear teeth of the bevel, the actuator ring is rotated within the cavity of the housing and about a midpoint. This causes the pivot arm to rotate, which causes the obturator element to pivot forcing the tongue and groove element of the obturator element into the central aperture.

In the open position (shown in FIGS. 6A and 7A), the obturator elements are positioned inside the circumference of the actuator ring, however, the elements do not block the central aperture 215. Once in the closed position, in order to move the valve to the open position, forces tangential to the actuator ring are applied to the gear teeth of the bevel, and the actuator ring is rotated within the cavity of the housing and about a midpoint. This causes the pivot arm to rotate, which causes the obturator element to pivot and move the obturator element out of the central aperture 215.

The first part of the housing has an inner channel 145 forming a ring surrounding the central aperture opening on the first surface of the housing. Extending radially outward from the inner channel are curved grooves 140. Each curved groove is adapted for receiving a wall seal, and each curved groove extends along arc followed by one end of an obturator element when it moves between an open and closed position. The inner channel has opposing sidewalls that are parallel to one another and are located below the surface 110. Additionally, an outer channel 150 forms a ring that is proximate to an inside from the edge of the surface 110. The outer channel is defined by two opposing sidewalls that are parallel to one another and wherein the walls are located below the surface 110. The first part of the housing may also include cylindrical shape cutouts 135 below the surface 110. These cutouts may be used to receive a pins, bolts or other pivotal fastener that allows each of the obturator elements to be pivotally attached to the surface of the housing.

Similar to the first part of the housing, the second part of the housing has an inner channel forming a ring surrounding the central aperture opening on the second surface of the housing. Extending radially outward from the inner channel or grooves 151. Each such groove is adapted for receiving a portion of a wall seal, and each groove extends along the arc followed by one end of an obturator element when it moves between an open and closed position. The inner channel, like the inner channel of the first part of the housing, has opposing sidewalls that are parallel to one another and are located below the surface 113. Additionally, an outer channel 155 forms a ring that is proximate to an inside from the edge of the surface 113. The outer channel of the second housing is defined by two opposing sidewalls that are parallel to one another and wherein the sidewalls are located below the surface in the 113. Similar to the first part of the housing, the second part of the housing includes cylindrical shape cutouts 160, wherein each of the cutouts below the surface 113.

O-rings and seals, not shown, are inserted into the inner and outer channels of the first and second parts of the housing. Additionally, additional gaskets, O-rings or seals may also be utilized within the cavity to accomplish a fluid tight seal if required. The first part of the housing may also include a slot 165 such that the tab of the actuator ring (further explained below and illustrated in FIG. 2) they move literally back and forth within the slot when the gear 170 provides force acts on the actuator ring.

FIG. 2 is an illustration of a perspective view of an actuator ring 115, according to one example embodiment. In the present embodiment, the actuator ring is a circular body having three pin bosses 205 coupled to an inside circumference of the actuator ring. The pin bosses may be integral with the inside circumference of the actuator ring or may be affixed thereto. A circular opening 210 within each pin boss located near the apex of each pin boss is adapted to be hingedly connected to a pivot arm (illustrated in FIG. 3) and each pivot arm 125 is pivotally attached to an obturator element (illustrated as 120 in FIG. 1A). In the present embodiment three pin bosses are shown. However, in other embodiments that utilize more than three obturator elements, then additional pin bosses may be used. The actuator ring has a tab 220 extending radially outward from a portion of the outside circumference of the actuator ring. The tab has a plurality of teeth 225 that is adapted to mate with the teeth of a bevel gear, as illustrated in FIG. 1A, the bevel gear may be driven by a mating year (not shown) or any other of generating rotational energy to cause the actuator ring to translate or rotate the actuator ring within the shutter valve. Additionally, in other embodiments (not shown), the actuator ring can be driven by an appropriate means such as gear, belts, shaft or some other apparatus to generate rotational energy required to move the actuator ring, and, by extension, the obturator elements.

Referring to FIG. 3, FIG. 3 is a perspective front view of a pivot arm 125, according to one embodiment of the present invention. The pivot arm is used to connect a portion of one of the obturator elements to the opening of a pin boss of the actuator ring. In the present embodiment, the pivot arm has an elongated flattened oval shaped body 305 having a pair of circular holes 310. One of the holes of the pivot arm is adapted to be coupled to the pin boss by a fastener and the second hole is adapted to be coupled to a portion of an obturator element.

Figure 4C:
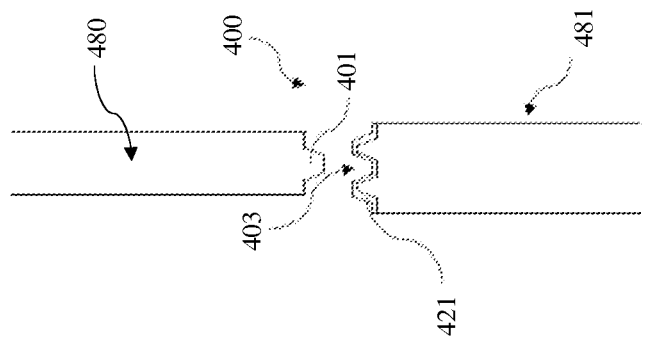
FIG. 4C is a cross-sectional view of two mating obturator elements of the shutter valve, in accordance with one embodiment.
Figure 4B:
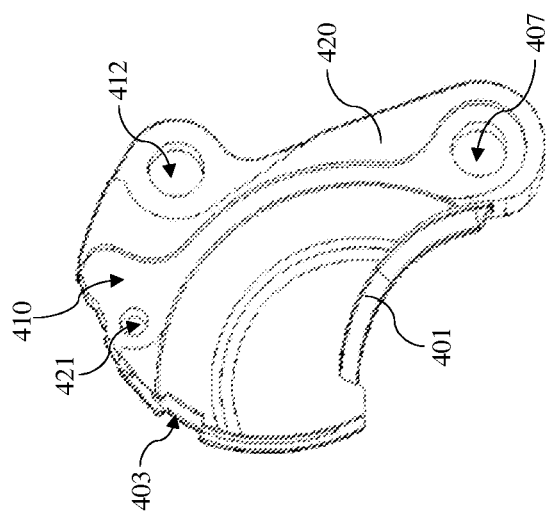
FIGS. 4A and 4B are perspective views of an obturator element of the shutter valve, according to an example embodiment.
Figure 4A:
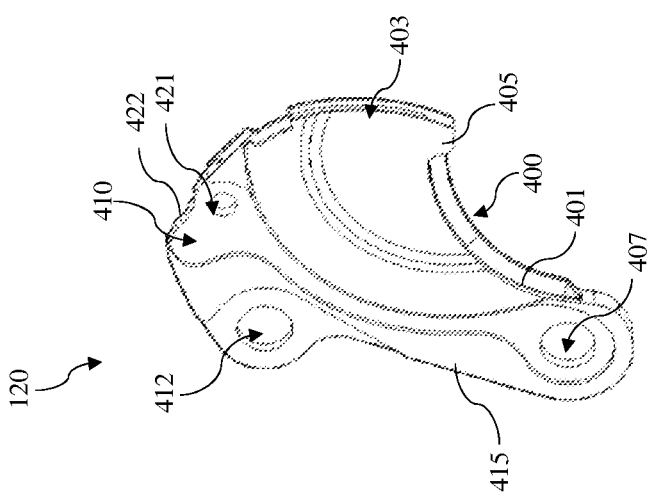

FIGS. 4A and 4B are perspective views of an obturator element 120 of the shutter valve, in accordance with one embodiment. Each obturator element defines a petal shaped structure having a shape defined by a plurality of sides. In one embodiment, each of the obturator elements are equally sized and shaped, but this is not meant to be a limitation.

Each obturator element further defines a tongue and groove feature 400 along at least a portion of the outside circumference of the petal shape structure. In the present embodiment, the tongue and groove feature is deposited on two (2) sides of the circumference, but this is not meant to be a limitation. In the present embodiment, on one side of the circumference, a tongue 401 of the tongue and groove feature 400 is located. The tongue can be a ridge protruding from the surface of the petal shaped structure that is adapted to fit into the groove 403 of an adjacent obturator element. On a second side of the circumference, a groove 403 of the tongue and groove feature 400 is located. Each groove is a channel defined by two opposing sidewalls and is located on a second side of the outside circumference. The surface of the circumference where the groove 403 is located defines the side surface of the obturator element, which side surface slides along the walled seals (further explained below). The tongue and groove feature further comprises a seal surface comprising of any suitable seal material. The tongue and groove element and seal surface is adapted to create a seal between the obturator elements. The obturator element can be manufactured from any suitable rigid material known to those skilled in the art.

The petal shape structure of each obturator element further defines a hook element 405 located at an apex of the petal shape structure. The hook element defines a hook or beak shape of the petal structure and is adapted to mate with the hook elements of other obturator elements when the valve is in a closed position. See FIG. 1A, which shows all obturator elements 120 in the closed position, and the hook features of all obturator elements mating with each other to completely occlude the lumen 215 and eliminating fluid flow through the lumen.

Each obturator element further defines a circular first obturator hole 407 that is adapted to receive a pin or pivotal fastener for pivotally mounting the obturator element to within the cavity formed by the first and second parts of the housing. A pin or shaft can be inserted into the circular first obturator hole 407 and into circular shaped cutouts 135 and 160 of the first and second parts of the housing to pivotally mount each obturator element to the surfaces the housing.

Each obturator element also includes an i-shaped channel 410 on the first surface 415 and on the opposing second surface 420. The i-shaped channel is below the surface of the obturator element and adapted to receive an i-shaped wiper. A hole 421 spanning from the first surface to the second surface of the obturator elements is adapted for receiving a fastener to facilitate fastening the i-shaped wiper after it has been on inserted onto the surfaces of the obturator element. A wiper disposed on the first surface of the obturator elements act as a sealing body and contacts the first planar surface, and a wiper disposed on the second surface of the obturator elements act as a sealing body and contacts the second planar surface. An i-shape is defined generally as a shape comprising an elongated bar-like element, and including a circular shape at one end.

Each obturator element further defines a circular second obturator hole 412 that is adapted to receive a pin or pivotal fastener for pivotally mounting the obturator element to the pivot arms which are mounted to the pin bosses 205 of the actuator. A pin or shaft can be inserted into the circular second obturator hole 412 and into circular holes of the pivot arms to pivotally mount each obturator element to a pivot arm.

FIG. 4C is a cross-sectional view of two mating obturator elements of the shutter valve 100, in accordance with one embodiment. FIG. 4C shows that each obturator element defines a tongue and groove feature 400 along at least a portion of the outside circumference of the petal shape structure. In the top obturator element 480, a tongue 401 of the tongue and groove feature 400 is located. The tongue can be a ridge protruding from the surface of the petal shaped structure that is adapted to fit into the groove 403 of an adjacent obturator element 481. The groove 403 is a channel defined by two opposing sidewalls, wherein the groove is designed to accept the tongue 401 of the adjacent obturator element 480 (when the valve 100 is in the closed position—see FIG. 1A) so as to create a seal. The tongue and groove feature 400 further comprises a seal surface 421 comprising of rubber, plastic, PTFE, vinyl, any combination thereof etc. The tongue and groove element and seal surface is adapted to create a seal between the obturator elements 480, 481.

Figure 5C:
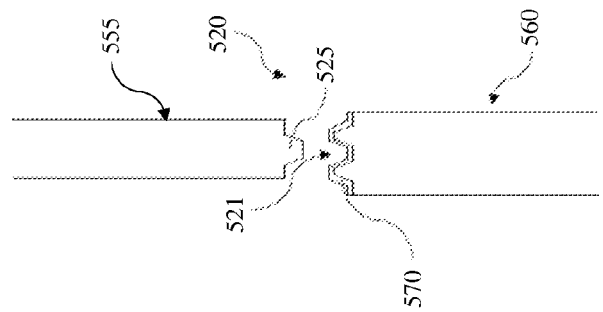
FIG. 5C is a cross-sectional view of a wiper mating with an inner ring seal of the shutter valve, in accordance with one embodiment.
Figure 5B:
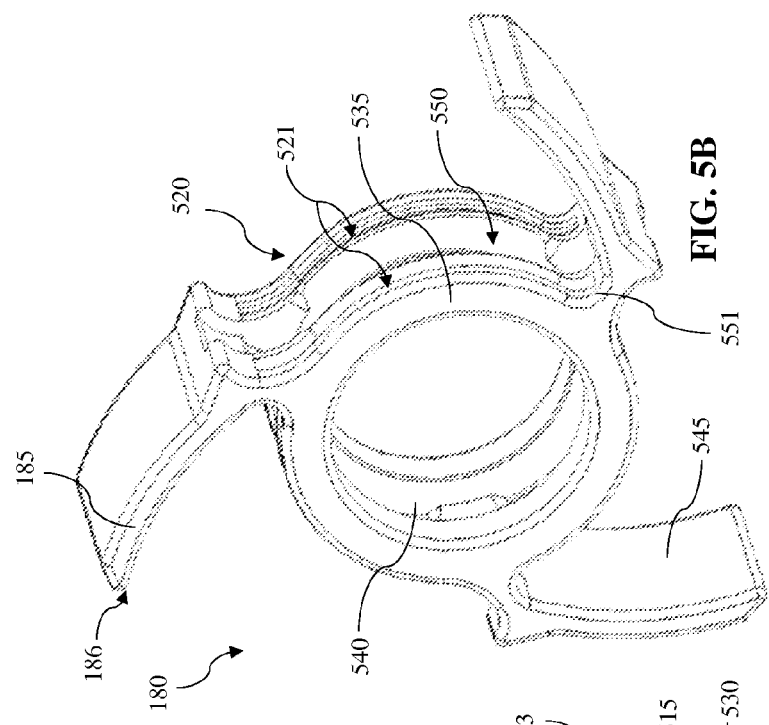
FIG. 5B is a perspective front view of three wall seals coupled to a pair of inner ring seals of the shutter valve, according to an example embodiment.
Figure 5A:
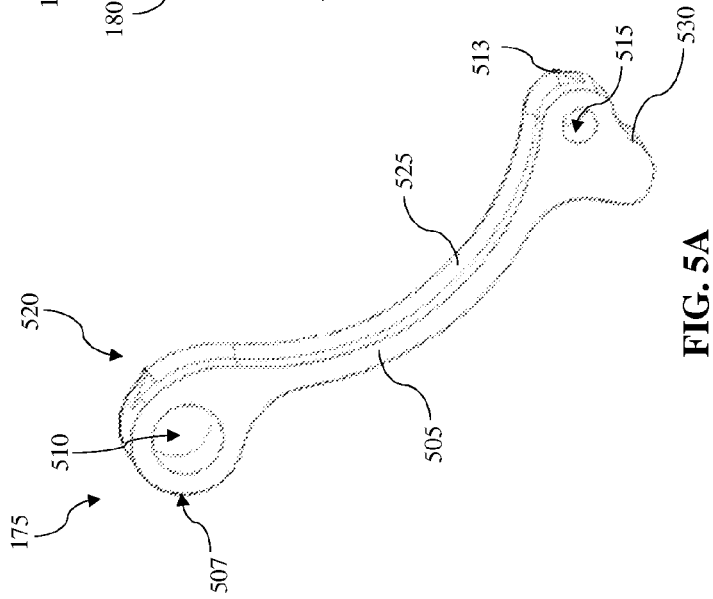
FIG. 5A is a perspective front view of a wiper of the shutter valve, according to an example embodiment.

FIG. 5A is an illustration of a wiper 175 of the shutter valve, according to an example embodiment. The wiper has a curved elongated i-shaped body 505 having a first end 507 opposing a second end 513. Each wiper such that one wiper fits inside the i-shaped grooves 410 of the first 415 and second 420 surfaces of each obturator element. Each wiper is sized such that a portion of the wiper extends above the first and second surfaces of the obturator elements. Each wiper has a first wiper hole 510 that is adapted to fit over the first hole 407 of the obturator element such that when fully assembled the fastener 181 can couple each obturator element to the cutouts 135, 160 of the first and second surfaces of the housing. Similarly, each wiper also has a second 515 wiper hole that is adapted to fit over the second hole 421 of the obturator element such that when fully assembled a fastener (not shown) can facilitate in coupling the wipers disposed on the first and second surfaces of each obturator element. Each wiper also includes a tongue and groove feature 520. In the present embodiment, a tongue 525 can be a ridge protruding from the surface of the wiper that is adapted to fit into the grooves 521 of the first and second inner ring seals (illustrated as 521 in FIG. 5B and further explained below). Each wiper may also include a gripping element 530 on the side of the second end of the wiper. The gripping element may be an uneven surface adapted to contact a surface 545 of one of the walled seals 185 (further explained below) to create a seal between the obturator element and the walled seal when the valve and obturator elements move between the closed to the open position.

FIG. 5B is an illustration of a pair of opposing inner ring seals and a plurality of wall seals, according to one embodiment of the present invention. FIG. 5B illustrates a pair of inner ring seals 535, 540 stacked on top of each other. When stacked, the inner rings are positioned and sized such that they have a vertical relief 535. The vertical relief is sized designed such that the obturator elements may be slid into the central aperture 215. Wall seals 185 extend radially outward and are coupled to the inner rings. Each of the wall seals has a surface 545 that is adapted to contact with and form a seal with the wipers 175 deposited on each obturator element and a side surface each obturator element. Each wall seal is a body having a cured wall shape such that the surface 545 of the wall matches the arc made by each obturator element as the obturator element moves between the closed and open position. Each wall seal is adapted to fit into the curved grooves of the 140, 151 on the first and second surfaces of the housing (as illustrated in FIG. 1B).

The inner rings have an outside circumference with a groove 521 creating the tongue and groove feature 520 that matches and creates a seal with the tongue of each wiper. When the valve is in the closed position, the tongue 525 of the wipers on the first and second surfaces of the obturator element is received by the grooves 521 of the inner ring seals creating a seal.

FIG. 5C is a cross-sectional view of a mating wiper and inner ring seal of the shutter valve 100, in accordance with one embodiment. FIG. 5C illustrates a wiper body 555 having a tongue 525 along at least a portion of the wiper. As mentioned above, the tongue can be a ridge protruding from the surface of the body of the wiper and is adapted to fit into the groove 521 of a portion of an inner ring seal. The groove 521 is a channel defined by two opposing sidewalls, wherein the groove is designed to accept the tongue 525 of the wiper (when the valve 100 is in the closed position—see FIG. 1A) so as to create a seal. The tongue and groove feature 520 further comprises a seal surface 570 comprising of rubber, plastic, PTFE, vinyl, any combination thereof etc. The tongue and groove element and seal surface is adapted to create a seal between the inner ring seal and the wiper. The tongue and groove feature further comprises a seal surface comprising of any suitable seal material.

Figure 6A:
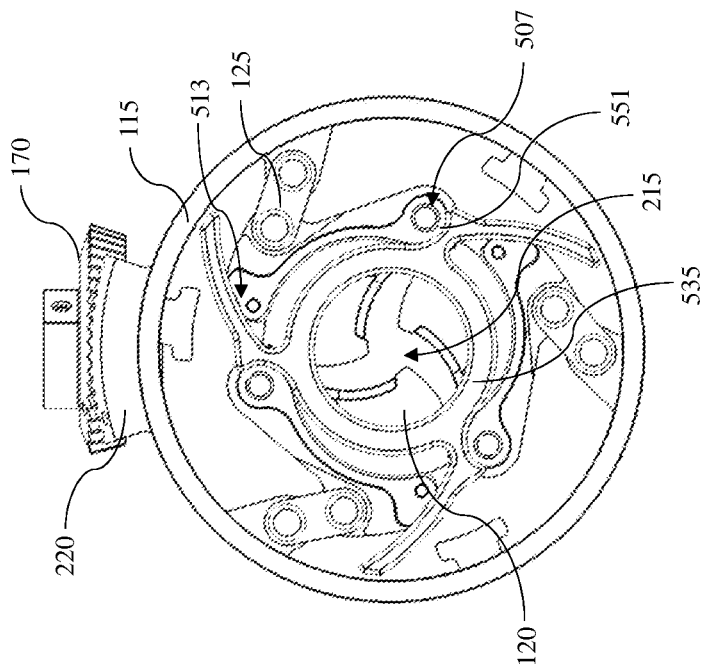
FIG. 6A is a front view of the array of obturator elements in a fully open state arranged within the actuator ring, in accordance with one embodiment.
Figure 7C:
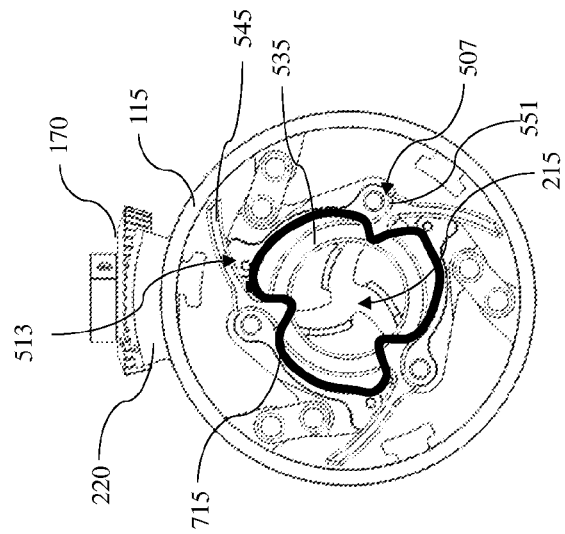
FIG. 7C is a front view of the array of obturator elements in a partially open state arranged within the actuator ring, and illustrating a perimeter of a third area formed by seals of the valve, in accordance with one embodiment.
Figure 7B:
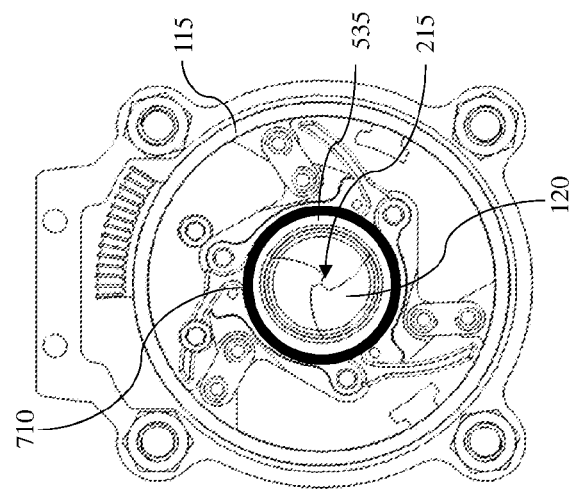
FIG. 7B is a front view of the array of obturator elements in a closed open state arranged within the actuator ring, and illustrating a perimeter of a second area formed by seals of the valve, in accordance with one embodiment.
Figure 7A:
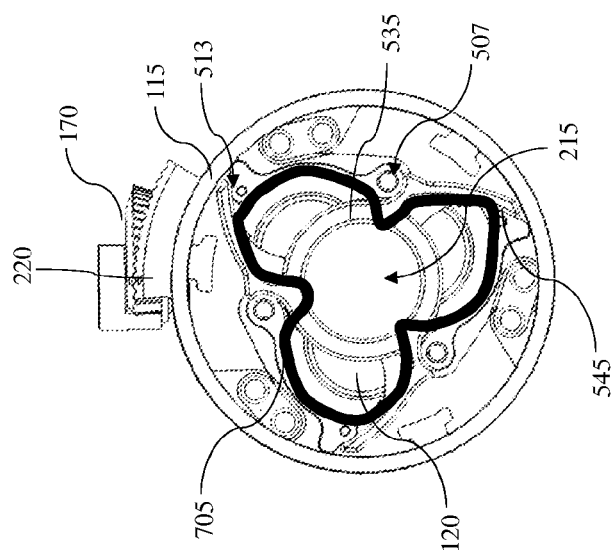
FIG. 7A is a front view of the array of obturator elements in a fully open state arranged within the actuator ring, and illustrating a perimeter of a first area formed by seals of the valve, in accordance with one embodiment.

When the valve is in an open position, as illustrated in FIGS. 6A and 7A, a portion of the second end 415 of the wipers and a portion of the side 422 of the obturator elements contact the terminal end 186 of the wall seals along surfaces 545. When in the open position the seals created by the plurality of wipers, obturator elements and wall seals prevent egress of fluid into a first area of the cavity. The wipers and wall seals are positioned such that adjacent wipers and wall seals elements contact one another to from an enclosed area. That is, in the open position, there is a perimeter defined by a chain of wipers and wall seals, wherein the perimeter forms a seal beyond which fluid cannot pass. The enclosed area defined by the perimeter forms a seal preventing fluids or gases from entering into a portion of the cavity of housing. Thus, in the open position, the valve allows the fluid travelling through the lumen to stay within a small area or first area of the cavity of the housing.

When the valve is in the closed position (as illustrated in FIGS. 1A and 7B), the obturator elements contact each other in the midpoint of the valve. Additionally, the tongues 525 of the wipers 175 on the first and second surfaces of the obturator elements are received by grooves 521 of the inner ring seals. When in the closed position, adjacent wipers and wall seals contact one another to from a smaller enclosed second area than the first area formed when in the open position. That is, in the closed position, there is a smaller perimeter defined by a chain of wipers and walled seals, wherein the smaller perimeter forms a seal beyond which fluid cannot pass. The smaller enclosed second area forms a seal preventing fluids or gases from entering into a substantial portion of the cavity of housing. Said smaller perimeter is substantially the same as the circular area defined by the lumen or central aperture 215. Thus, in the closed position, the valve only allows the fluid travelling through the lumen or central aperture to stay within substantially the lumen and prevents it from entering into the cavity of the housing.

When the valve moves between the closed position and an open position, second end 513 of wipers (on the first and second surface of the obturator element) and the side surface 422 of the obturator elements continuously contact surfaces 545 of the wall seals 185 during the movement of the obturator element, which creates a seal chain. When the obturator elements move from the open position to the closed position, fluid within the first area is substantially expelled into the central aperture 215 or lumen of the valve.

Each obturator element further defines a tongue and groove feature 400 along at least a portion of the outside circumference of the petal shape structure. In the present embodiment, the tongue and groove feature is deposited on two (2) sides of the circumference, but this is not meant to be a limitation. In the present embodiment, on one side of the circumference, a tongue 401 of the tongue and groove feature 400 is located. The tongue can be a ridge protruding from the surface of the petal shaped structure that is adapted to fit into the groove 403 of an adjacent obturator element. On a second side of the circumference, a groove 403 of the tongue and groove feature 400 is located. Each groove is a channel defined by two opposing sidewalls and is located on a second side of the outside circumference. The surface of the circumference where the groove 403 is located defines the side surface of the obturator element, which side surface slides along the walled seals (further explained below). The tongue and groove feature further comprises a seal surface comprising of any suitable seal material. The tongue and groove element and seal surface is adapted to create a seal between the obturator elements. The obturator element can be manufactured from any suitable rigid material known to those skilled in the art.

FIG. 6A is a front view of the array of obturator elements in a fully open state arranged within the actuator ring, in accordance with one embodiment. In the fully open state, the array of obturator elements are positioned inside the actuator ring 115 such that the obturator elements do not block the central aperture 215 such that fluids can freely flow through the central aperture. In the fully open state, the pivot arm 125 is positioned such that each of the obturator elements does not block the central aperture. The wipers 175 on top of each of the obturator elements, adjacent abutting wall seals 185 and curved features 551 on the inner ring seals form a chain of seals. Such chain of seals forms a perimeter of the first area (further illustrated in FIG. 7A and explained below). When the valve is in the fully open state as illustrated in FIG. 6A, fluid may flow into the first area, however it is confined to the perimeter of the first area formed by the chain of seals (as seen in FIG. 7A).

Figure 6B:
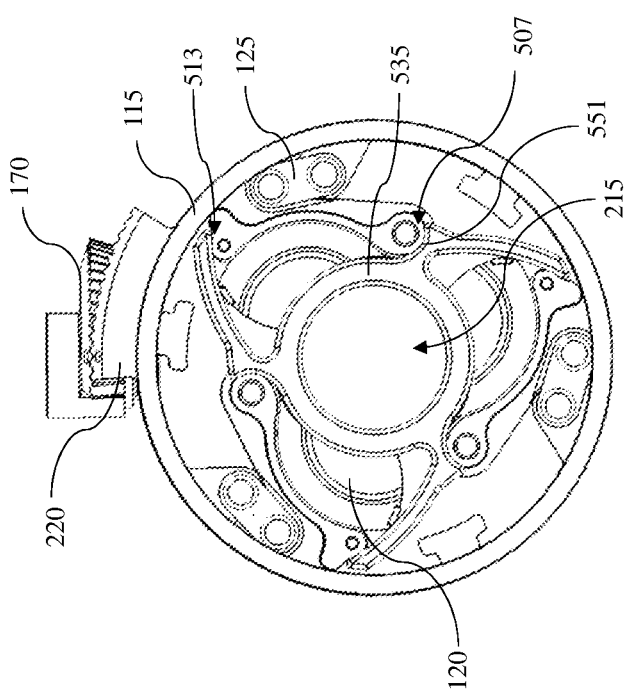
FIG. 6B is a front view of the array of obturator elements in a partially open state arranged within the actuator ring, in accordance with one embodiment.

FIG. 6B is a front view of the array of obturator elements in a partially open state arranged within the actuator ring, in accordance with one embodiment. In order to move from the fully open position to partially open position or state, the gear 170 provides rotational forces that act on the teeth of the tab 220 causing the actuator ring to move. As a result of the actuator ring moving, forces are applied to the pivot arm 125, which cause a portion of the obturator elements to move into the central aperture 215. As explained above, as the obturator elements move into the central aperture, the second end 513 of the wiper bodies on top of the first and second surfaces 415, 420 of the obturator elements contact the wall surfaces 545 of the wall seals form a seal along with the curved feature 551 of the inner ring seals that contact adjacent first ends 507 of the body of the wipers. Such chain of seals form a perimeter of a third area (illustrated in FIG. 7C and further explained below).

FIG. 7A is a front view of the array of obturator elements in a fully open state arranged within the actuator ring illustrating a perimeter 705 of a first area formed by seals of the valve, in accordance with one embodiment. The perimeter of the first area (illustrated as a thick black outline in FIG. 7A) is formed by the seal formed by the first end 507 of the wider body abutting an adjacent curve feature 551 and the second end 513 of each of the wipers abutting the wall surface 545 of the wall seal. As fluid flows through the central aperture 215, the perimeter defining the first area only allows fluid to enter into the first area thereby reducing the wear and tear of the remaining components of the valve.

FIG. 7B is a front view of the array of obturator elements in a closed open state arranged within the actuator ring illustrating a perimeter 710 of a second area (illustrated as a thick black outline in FIG. 7B) formed by seals of the valve, in accordance with one embodiment. In the closed position, the obturator elements 120 completely block the central aperture. In the closed position, as explained above, the tongue 525 of the wipers on top of the first and second surface of the obturator elements enter into the grooves 521 of the first and second inner ring seals. When the grooves of the wipers enter into the inner ring seals, a second area defined by the perimeter 710 is formed. In the closed position fluid is blocked from flowing through the central aperture 215. Additionally, an additional seal is formed by the chain of seals of the wipers and inner seals. The second area is smaller than the first area.

FIG. 7C is a front view of the array of obturator elements in a partially open state arranged within the actuator ring illustrating a perimeter 715 of a third area (illustrated as a thick black outline in FIG. 7C) formed by seals of the valve, in accordance with one embodiment. As the gear moves, the tab moves, causing forces to act on the pivot arm moving each of the obturator elements into the central aperture. The second end 513 of the wiper bodies on top of the first and second surfaces 415, 420 of the obturator elements contact the wall surfaces 545 of the wall seals, the curve features 551 and adjacent first end 507 of the body of the wipers contact each other, and form a chain of seals forming a third area defined by a third perimeter 715. In the partially open the flow of fluid is confined to the third area. As explained above, as the valve moves from the fully open position or states into the partially open or closed state, the size of the perimeter of the area formed by the seals decreases which causes fluid to be expelled into a lumen. The second area is smaller than the first area, the third area is smaller than the first area, and the third area is larger than the second area.

Figure 8A:
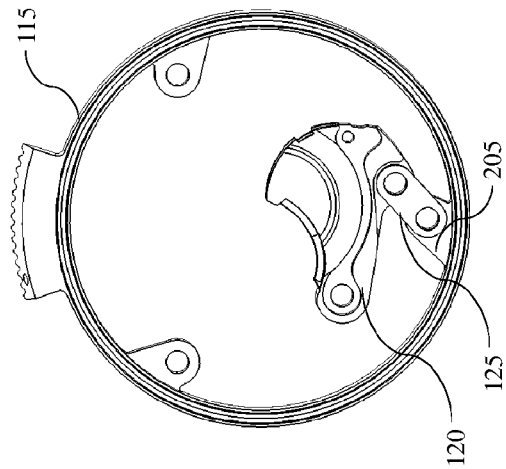
FIG. 8A is a front view of an obturator element, the actuator ring and pivot arm in a fully open state, in accordance with one embodiment.

FIG. 8A is a front view of an obturator element 120, the actuator ring 115 and pivot arm 125 in a fully open state, in accordance with one embodiment. In the fully open state, the obturator element 120 is positioned in a retracted state inside the actuator ring 115 such that the obturator element does not block the central aperture 215 such that fluids can freely flow through the central aperture. In the fully open state, the pivot arm 125 is positioned in a retracted state such that the obturator element does not block the central aperture.

Figure 8B:
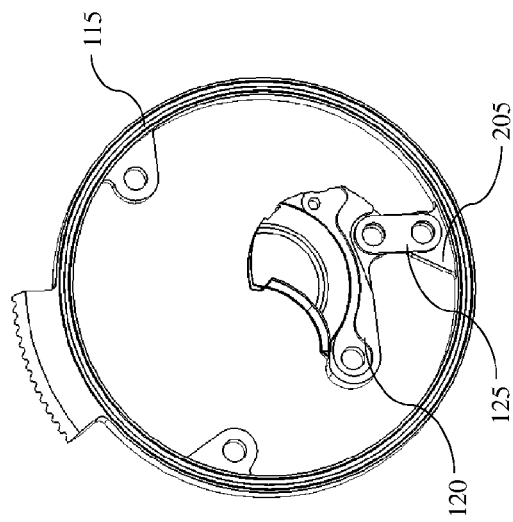
FIG. 8B is a front view of an obturator element, the actuator ring and pivot arm in a fully closed state, in accordance with one embodiment.

FIG. 8B is a front view of an obturator element 120, the actuator ring 115 and pivot arm 125 in a fully closed state, in accordance with one embodiment. In the fully closed state, the obturator element 120 is positioned in an extended state inside the actuator ring 115 such that the obturator element blocks the central aperture 215 such that fluids cannot freely flow through the central aperture. In the fully closed state, the pivot arm 125 is positioned in an extended state such that the obturator element blocks the central aperture. Also, in the fully closed state, FIG. 8B shows that the ring 115 has been rotated counterclockwise such that the arm 125 is extended inwards and pushes the obturator element inwards so as to block the central aperture.

Figure 8C:
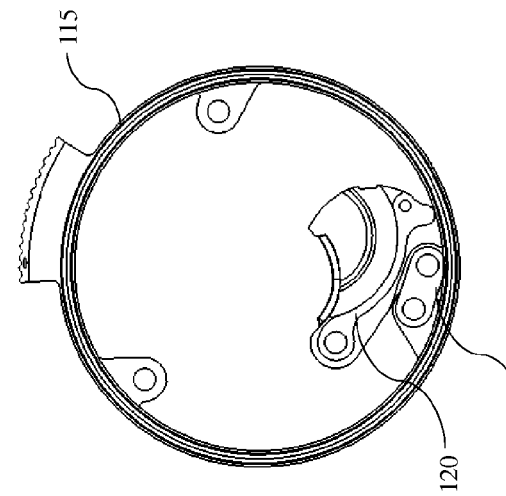
FIG. 8C is a front view of an obturator element, the actuator ring and pivot arm in a partially open state, in accordance with one embodiment

FIG. 8C is a front view of an obturator element 120, the actuator ring 115 and pivot arm 125 in a partially open state, in accordance with one embodiment. In the partially open state, the obturator element 120 is positioned in an partially extended state inside the actuator ring 115 such that the obturator element partially blocks the central aperture 215 such that fluids cannot freely flow through the central aperture. In the partially open state, the pivot arm 125 is positioned in a partially extended state such that the obturator element partially blocks the central aperture. Also, in the partially open state, FIG. 8C shows that the ring 115 has been rotated counterclockwise (less so than in FIG. 8B) such that the arm 125 is partially extended inwards and pushes the obturator element inwards so as to partially block the central aperture.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A shutter valve for regulating pressure and controlling fluid flow, comprising:
   an actuator ring that rotates about a midpoint;
   three or more obturator elements, wherein each obturator element includes a first surface opposing a second surface, and wherein each obturator element is movably coupled to the actuator ring;
   a housing defining a cavity for holding the actuator ring and the obturator elements, the housing including a first planar surface that faces the first surface of each obturator element and further including a second planar surface that faces the second surface of each obturator element;
   a plurality of wipers, each wiper comprising a seal material disposed on the first or second surface of the obturator elements such that each wiper contacts the first or second planar surface of the housing, wherein each wiper acts as a seal disposed between the first or second surface of the obturator elements and the first or second planar surface of the housing;
   curved grooves disposed on the first and second planar surfaces of the housing, wherein each curved groove is adapted for receiving a wall seal, wherein each curved groove extends along an arc followed by one end of each obturator element when it moves between an open and closed position;
   a plurality of wall seals, wherein each wall seal is disposed within each curved groove, wherein when a corresponding obturator element moves between an open and closed position, one end of the obturator element contacts the wall seal, which acts as a seal disposed between the wall seal and the obturator element; and
   wherein the seals created by the plurality of wipers and the plurality of wall seals prevent egress of fluid into at least a portion of the cavity of the housing.

2. The shutter valve of claim 1, wherein when a corresponding obturator element moves between an open and closed position, a portion of a wiper on one end of the obturator element contacts the wall seal.

3. The shutter valve of claim 2, wherein each of the plurality of wipers is composed of any suitable seal material.

4. The shutter valve of claim 3, wherein each of the plurality of wall seals is composed of any suitable seal material.

5. The shutter valve of claim 4, wherein when the obturator elements are in an open position, the seals created by the plurality of wipers and the plurality of wall seals prevent egress of fluid into a first area of the cavity of the housing;
   wherein when the obturator elements are in the closed position, the seals created by the plurality of wipers and the plurality of wall seals prevent egress of fluid into a second area of the cavity of the housing; and
   wherein the first area is larger than the second area.

6. The shutter valve of claim 5, wherein when an obturator element moves between an open and closed position, a portion of a wiper on one end of a corresponding obturator element continuously contacts a wall seal during movement of the obturator element.

7. The shutter valve of claim 6, wherein when the obturator elements move from an open position to a closed position, at least a portion of the fluid within the first area is expelled into a lumen of the shutter valve.

8. The shutter valve of claim 1, wherein each of the obturator elements defines a petal shape structure including a tongue and groove feature along at least a portion of an outside circumference, wherein the petal shape structure further comprises a seal surface along at least a portion of the outside circumference, and wherein the first and second surfaces of the obturator elements have a groove adapted to receive a wiper.

9. The shutter valve of claim 1, wherein the seal surface of each of the obturator elements is composed of any suitable seal material.

10. The shutter valve of claim 1, wherein the actuator ring comprises a plurality of obturator pin bosses, each pin boss affixed within an inside circumference of the actuator ring, wherein each obturator pin boss is hingedly connected to a pivot arm, and wherein each pivot arm is hingedly connected to one of the obturator elements.

11. The shutter valve of claim 1, wherein the obturator elements move between an open position and a closed position when forces tangential to the actuator ring are applied to gear teeth.

12. The shutter valve of claim 1, wherein each wiper defines an elongated i-shaped body having a ridge along a portion of a perimeter, wherein each ridge is adapted to be received by a groove along a portion of an outside circumference of an inner ring seal.

13. The shutter valve of claim 1, wherein the shutter valve further includes a pair of opposing inner ring seals having vertical relief, wherein each inner ring seal has an outside circumference having a groove adapted to receive the ridge of a wiper when the obturator element is in the closed position.

14. The shutter valve of claim 13, wherein each of the plurality of wall seals is connected to and extends radially outward from the pair of inner ring seals.

15. A shutter valve for regulating pressure and controlling fluid flow, comprising:
- an actuator ring that rotates about a midpoint;
- three or more obturator elements, wherein each obturator element includes a first surface opposing a second surface, wherein each obturator element is movably coupled to the actuator ring, wherein each of the obturator elements defines a petal shape structure including a tongue and groove feature along at least a portion of an outside circumference, wherein the petal shape structure further comprises a seal surface along at least a portion of the outside circumference, and wherein the first and second surfaces of the obturator elements have a groove adapted to receive a wiper;
- a housing defining a cavity for holding the actuator ring and the obturator elements, the housing including a first planar surface that faces the first surface of each obturator element and further including a second planar surface that faces the second surface of each obturator element;
- a plurality of wipers, each wiper comprising a seal material disposed on the first or second surface of the obturator elements such that each wiper contacts the first or second planar surface of the housing, wherein each wiper defines an elongated i-shaped body having a ridge along a portion of a perimeter, wherein each ridge is adapted to be received by a groove along a portion of an outside circumference of an inner ring seal, and wherein each wiper acts as a seal disposed between the first or second surface of the obturator elements and the first or second planar surface of the housing;
- a pair of opposing inner ring seals, wherein each inner ring seal has an outside circumference having a groove adapted to receive the ridge of a wiper when the obturator element is in a closed position;
- curved grooves disposed on the first and second planar surfaces of the housing, wherein each curved groove is adapted for receiving a wall seal, wherein each curved groove extends along an arc followed by one end of each obturator element when it moves between an open and closed position;
- a plurality of wall seals, wherein each wall seal is disposed within a curved groove of the first and second planar surfaces of the housing, wherein when a corresponding obturator element moves between an open and closed position, one end of the obturator element contacts the wall seal, which acts as a seal disposed between the wall seal and the obturator element; and
- wherein the seals created by the plurality of wipers and the plurality of wall seals prevent egress of fluid into at least a portion of the cavity of the housing.

16. The shutter valve of claim 15, wherein when a corresponding obturator element moves between an open and closed position, a portion of a wiper on one end of the obturator element continuously contacts the wall seal;
- wherein when the obturator elements are in an open position, the seals created by the plurality of wipers and the plurality of wall seals prevent egress of fluid into a first area of the cavity of the housing;
- wherein when the obturator elements are in the closed position, the seals created by the plurality of wipers and the plurality of wall seals prevent egress of fluid into a second area of the cavity of the housing; and,
- wherein the first area is larger than the second area.

17. The shutter valve of claim 16, wherein when an obturator element moves between an open and closed position, a portion of a wiper on one end of a corresponding obturator element continuously contacts a wall seal during movement of the obturator element, and wherein when the obturator elements move from an open position to a closed position, at least a portion of the fluid within the first area is expelled into a lumen of the shutter valve.

* * * * *